(12) United States Patent
Hyllberg et al.

(10) Patent No.: US 6,616,584 B2
(45) Date of Patent: Sep. 9, 2003

(54) ELASTOMERIC COVERED ROLLER HAVING A THERMALLY SPRAYED BONDING MATERIAL

(75) Inventors: Bruce E. Hyllberg, Gurnee, IL (US); Gary S. Butters, Greenfield, WI (US); Gregory T. Squires, Union Grove, WI (US); Paul J. Kaprelian, Franksville, WI (US)

(73) Assignee: American Roller Company, LLC, Union Grove, WI (US)

( * ) Notice: Subject to any disclaimer, the term of this patent is extended or adjusted under 35 U.S.C. 154(b) by 0 days.

(21) Appl. No.: 10/142,293

(22) Filed: May 9, 2002

(65) Prior Publication Data

US 2002/0166234 A1 Nov. 14, 2002

Related U.S. Application Data

(62) Division of application No. 09/570,250, filed on May 12, 2000, now Pat. No. 6,394,944.

(51) Int. Cl.⁷ .................................................. B23P 15/00
(52) U.S. Cl. ........................ 492/54; 492/56; 29/895.21
(58) Field of Search ........................ 29/895.21, 895.32, 29/895.3; 492/54, 56, 58

(56) References Cited

U.S. PATENT DOCUMENTS

| 3,877,125 | A | * | 4/1975 | Finzer | 29/895.21 |
| 5,023,985 | A | * | 6/1991 | Salo et al. | 492/53 |
| 5,235,747 | A | * | 8/1993 | Leino et al. | 29/895.32 |
| 5,283,121 | A | * | 2/1994 | Bordner | 428/381 |
| 5,334,288 | A | * | 8/1994 | Nasu et al. | 162/358.1 |
| 5,718,970 | A | * | 2/1998 | Longo | 428/325 |

* cited by examiner

*Primary Examiner*—I Cuda-Rosenbaum
(74) *Attorney, Agent, or Firm*—Quarles & Brady LLP

(57) ABSTRACT

A elastomer-covered roller (10) is provided with an improved bond coating for bonding the elastomeric cover (14) to the core (11). At least one layer of material (15) is thermally sprayed on the core to form a rough surface having a roughness from 400 microinches $R_a$ to 2000 microinches $R_a$ or greater. In a further improvement a denser, less porous layer (17) may be applied next to the core to protect the core from corrosion, followed by a less dense layer (19) applied to the first layer and having a similarly rough surface (20) for good mechanical bonding.

19 Claims, 2 Drawing Sheets

ELASTOMERIC COVERED ROLLER HAVING A THERMALLY SPRAYED BONDING MATERIAL

CROSS REFERENCE TO RELATED APPLICATION

This is a division of U.S. appl. Ser. No. 09/570,250 filed May 12, 2000, now U.S. patent No. 6,394,944.

TECHNICAL FIELD

The invention relates to the manufacture of elastomeric-covered rollers.

DESCRIPTION OF THE BACKGROUND ART

Rollers with covers of elastomeric material are used in a wide variety of industrial applications. One process is a plastic film manufacturing process known as cast film extrusion. Films of thermoplastic polymers such as polyvinylchloride and polycarbonate are made by this process. The most popular polymers made by this process are polyethylene and polypropylene.

In a typical application, molten polymer from an extruder is dropped into a nip formed between a chrome-plated steel roller and an elastomer-covered steel roller. One common type of elastomer used in this application is silicone rubber, although Hypalon™, available from Du Pont, and other polymer materials can also be used. The chrome-plated steel roller and the elastomer-covered roller are normally water cooled, or otherwise chilled, since the molten plastic may be at a temperature of several hundred degrees Fahrenheit. The chrome-plated roller quickly chills the plastic below its melting point and the nip formed with the elastomer-covered roller determines the gauge (thickness) and the surface finish of the film. The flexibility of the rubber covering compensates for minor machine misalignment and other variables, and provides a wider nip than two hard surfaced rollers.

Silicone rubber is a material that may be used as the cover in the elastomer-covered roller described for the above application. Silicone rubber is, however, a material that is difficult to bond to a metal roller core on a consistent basis. It is also difficult to maintain the bond in applications where the roller is used at high temperature and high pressure. In some cases, the silicone rubber may peel cleanly off the metal core without leaving any residue of rubber, indicating a loss of bonding. Loss of bonding in one area requires that the elastomer-covered roller be replaced.

The fact that the elastomer peels cleanly from the metal core surface, leaving little if any rubber residue on the core, indicates that the strength of the rubber/metal bond is weaker than that of the rubber itself. An adequate rubber/metal bond is generally considered to be one that is greater than the strength of the rubber. Bond interfaces that are initially adequate when formed can deteriorate relatively quickly under thermal or mechanical stresses in an actual field application. This is especially true for elastomers that are either inconsistent in their bonding properties or do not form particularly strong bonds to metals. Included in this group are silicone, EPDM (ethylene-propylene-diene-monomer), and urethane elastomers. Current methods of core surface preparation, prior to elastomeric bonding, include disc or belt sanding, shot blasting, sand blasting, and grit blasting. A cleanly tooled surface is not generally rough enough to promote a strong rubber to metal bond. These methods attempt to further clean the core surface of all oxides and contaminants, after solvents have been used to remove greases and oils, while increasing the surface area available for bonding. After the metal surface has been prepared, one or more chemical bonding agents are applied. These materials are specific to the type of elastomer being used and are well known in the industry. The total thickness of these bonding agents is frequently on the order of one mil.

The best surfaces for bonding that can be produced are by grit or shot blasting. The maximum roughness value that can be consistently achieved, with adequate process controls, is in the 500 microinches $R_a$ range, but typical values for most processes are lower. Blasting increases the surface roughness and surface area but the surface profile is relatively simple, just peaks and valleys. The best grit blasted surface preparation will produce an adequate bond to the elastomer cover and will not peel cleanly at the rubber/metal bond interface under normal temperature and pressure stresses. However, the amount of rubber residue left on the core is relatively small.

A roller under mechanical stress, such as a silicone covered roller for example, has a concentration of stress at the rubber to metal interface, because of the vast difference in the compression modulus values between the elastomer and the core. This stress riser tends to shear the rubber away from the core at the bond interface.

An improved bonding surface is needed for elastomers that are weakly or inconsistently bonded, especially if the covered rollers are exposed to high temperature or pressures, or high moisture conditions. The bonding surface must provide a high surface area and surface roughness and yet be easily and consistently produced. A very high surface roughness will also diffuse the stress riser at the bond interface improving the longevity of the rubber to metal bond.

Polyurethane is another material that can be used for the elastomeric cover in the present invention. For bonding polyurethane to supporting layers, primary reliance has been placed on chemical bonding, to be assisted by mechanical bonding. As with silicone-based materials, the limit of surface roughness available with current methods of mechanical bonding is about 500 microinches $R_a$.

In addition, water vapor easily permeates through either a silicone rubber layer or a polyurethane layer, and corrosion may occur at the bond line due to the collection of water vapor there. Moisture will migrate into the outer roller cover if the roller is either chilled or exposed to water in the application. It would be beneficial to provide a bond coat or layer that is resistant to such corrosion, as well as one providing a stronger mechanical bond.

SUMMARY OF THE INVENTION

The invention concerns a method of making a roller that includes thermally spraying a bond coat to substantially cover a portion of the core on which an elastomeric layer is to be bonded and in which the bond coat provides a surface roughness to assure a strong mechanical bond to the elastomeric layer.

The invention also concerns a roller resulting from the method and having a bond coat with a surface roughness that provides a strong mechanical bond to an elastomeric layer.

The bond coat comprises a thermally sprayed material selected from a group of materials consisting of metals, metal alloys, ceramics and cermets.

In the prior art, core surfaces were prepared by sanding or blasting the metal core prior to the application of chemical bonding agents. These methods do not always produce the desired level of mechanical bonding. Thermal spraying has been known in the manufacture of ceramic covered rollers, but has not heretofore been applied to bond elastomeric layers to a metal core.

The invention provides improved constructions of elastomeric rollers. These elastomers include silicone, EPDM (ethylene-propylene-diene-monomer), urethane elastomers and other synthetic or natural rubber elastomers. Although the invention is described in examples in which the elastomeric layer is the outer layer, it would also be possible to add layers outside the elastomeric layer.

The invention may be practiced in further aspects by providing a two-layer bond coat in which the material of the base layer is denser for protection against corrosion and the top layer is coarser for a better bonding. Other objects and advantages of the invention, besides those discussed above, will be apparent to those of ordinary skill in the art from the description of the preferred embodiments which follow. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

DETAILED DESCRIPTION OF THE PREFERRED EMBODIMENTS

Figure 1:
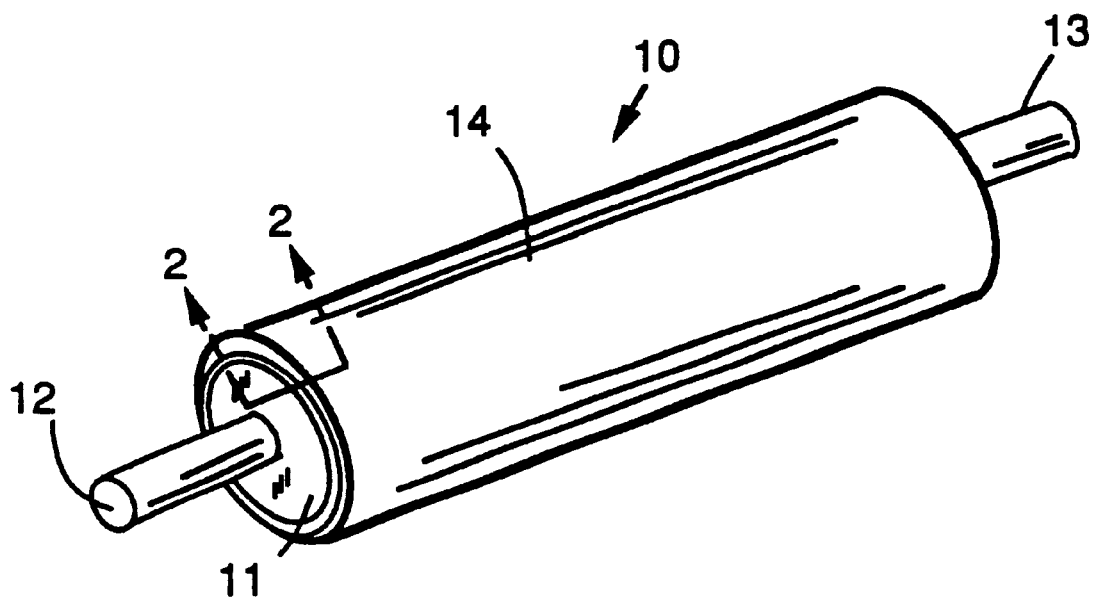
FIG. 1 is a perspective view of a roller incorporating the present invention.

Referring to FIG. 1, an elastomer covered roller 10 of the present invention includes a core 11, with journal shafts 12, 13 extending from opposite ends of the core 11, and a layer 14 of elastomeric material, in this example, silicone rubber, which in this example forms the outer cover of the roller 10. The core 11 may be made of metal, such as steel, or it may be made of a fiber-reinforced resinous composite material as disclosed in Carlson, U.S. Pat. No. 5,256,459, issued Oct. 26, 1993.

The elastomeric material may be applied using conventional and known methods. Silicone rubber can be applied using methods such as liquid casting, various forms of extrusion, or by wrapping the core with calendered sheets of rubber. Urethanes may be applied by liquid casting into a mold or by a liquid ribbon process described in U.S. Pat. No. 5,206,992 and U.S. Pat. No. 5,415,612 assigned to the assignee of the present invention.

Figure 2:
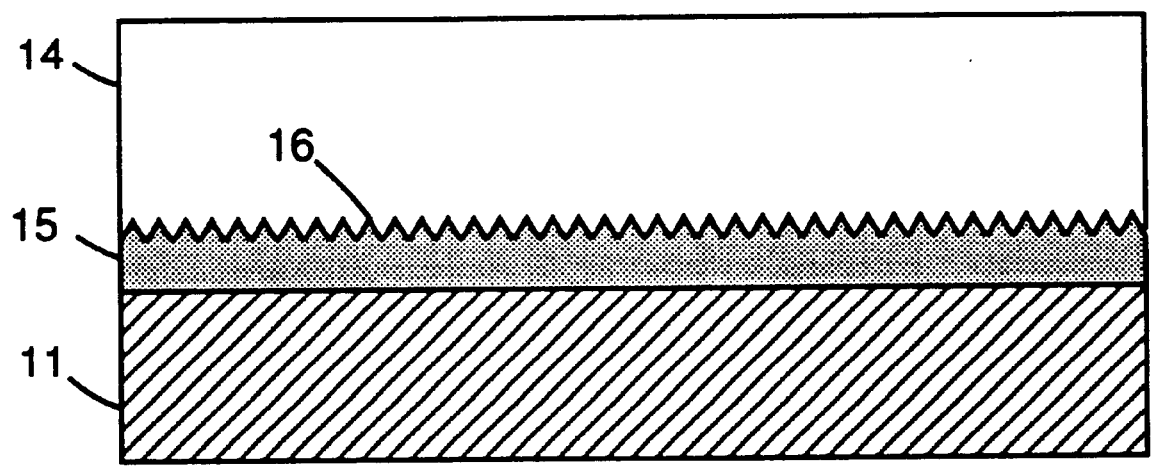
FIG. 2 is a detail sectional view of a first embodiment of the present invention taken in a plane indicated by line 2—2 in FIG. 1.

As seen in more detail in FIG. 2, a layer 15 of thermally sprayed material is applied to the core 11 as a bonding surface for the cover material 14. This layer 15 is typically composed of a ceramic, cermet, metal, or alloy. The preferred materials are relatively high in porosity, while retaining structural integrity. These materials also provide rough, complex surfaces after spraying and are easily bonded to rubber. Unlike the simple surface profiles produced by sanding and blasting, thermally sprayed surfaces are more complex and have many surface features that can trap the rubber to form an interlocking bond. Layers produced by the wire arc process are somewhat more complex than sanded or blasted surfaces. Layers produced by the application of thermally sprayed powders are even more complex. Bonding surfaces produced by thermally sprayed powders are used for bonding ceramics to metals, a process which is entirely mechanical. When it is desired to bond an elastomer to a metal or alloy core, the bond is produced by a combination of chemical bonding and mechanical bonding. In that case, it is typical to apply bonding agents and primers over the thermally sprayed bond coat. This allows the elastomer to become chemically bonded to the thermally sprayed core.

The surface roughness for robust mechanical bonding of silicone rubber or similar materials is at least 400 microinches $R_a$ or more, although a surface roughness of only 200 microinches Ra will provide a bond adequate for many applications ($R_a$ denotes average roughness under ASME standards and numerical measure in units of microinches.) With the thermally sprayed material, surfaces up to 2000 microinches $R_a$ have been successfully tested and provide a superior mechanical bond. Ceramics typically provide a surface roughness of less than 300 microinches $R_a$, if used alone, and do not provide bonding surfaces which are as robust as materials providing rougher surfaces. Alumina, alumina/titania, and zirconia ceramics can be used in combination with metals to increase the texture of bonding surface 16.

The preferred material is a metal or alloy, in wire or rod form, applied by a thermal spraying step. The resulting roughness of the surface 16 is in a range from approximately 500 microinches $R_a$ to approximately 2000 microinches $R_a$. The maximum surface roughness of a thermally sprayed coating that can currently be produced is in the 2000 Ra range. The roughness of the surface 16, as well as the thickness of the layers 11, 14, and 15 have been exaggerated in FIGS. 2 and 3. This roughness level greatly improves the mechanical bond strength of the rubber-to-metal interface. One example is Sulzer Metco #2 wire, which is a Nr. 420-type (400 series) stainless steel alloy. 300 Series alloys can also be used. This material can be sprayed at high rates (>25 pounds per hour), is low in cost, and can be applied in a series of thinner coating layers or in a very thick layer. This material also bonds well to most elastomers. It provides the steel roller core 11 with a measure of corrosion protection even though it is somewhat porous. Sulzer Metco #2 wire for example, applied by the wire arc thermal spray process, can be applied in practical layers up to at least 250 mils in thickness. Thicker layers can be applied but may not be cost effective compared to other means to increase the core diameter. One of the problems with conventional rubber roller re-covering is that part of the core surface is frequently machined off to provide a clean bonding surface. Over a period of time, the core diameter becomes too small to use or the rubber cover thickness increases excessively. With a layer of thermal spray material on the core, it is no longer necessary to remove part of the core surface to prepare the core surface for recovering. Part or all of the thermal spray layer can easily be machined off and replaced. Also, a few mils of the thermal spray layer can be ground off to clean the surface, followed by a thin application of the same thermal spray material. A new layer of thermal spray material is easily bonded to an old one. The materials bond well together, as long as the sprayed surface is clean and free from grease and oil. The addition of a thermally sprayed layer can be used to help control the outer diameter of the core.

Other thermally sprayed materials and methods have also proven to provide a superior bonding surface according to the present invention. Eutectic 18923 and Sulzer Metco 43C powders, which are both 80/20 alloys of nickel and chromium metals can be used. These materials, as well as any corrosion resistant thermal spray material, 300 series and 400 series stainless steels, nickel chrome alloys, and other nickel-based alloys, provide both corrosion protection of the core and a suitable bonding surface for elastomers. The surface profiles of most thermally sprayed metals and alloys are very similar for a given particle size in the starting material. The roughness of the surface formed by a layer of Eutectic 18923 is typically 400 microinches $R_a$ while the Sulzer Metco 43C provides a surface roughness of about 700 microinches $R_a$, if sprayed with an oxygen-fuel gun device such as the Eutectic Teradyne 3000 or Sulzer Metco 6P. The particle size of the 43C is larger than the 18923 which accounts for the $R_a$ difference. A thickness of the coating or layer 15 of these materials in a range from 3 to 20 mils has provided strong and uniform bonds to an outer layer 14 of silicone rubber although thinner layers can be used as long as the thickness of the coating can be made uniform.

Although the Eutectic 18923 and 43C coatings do not provide as rough a bonding surface as the Sulzer Metco #2 wire arc coatings, these materials still provide a bond interface having properties superior to a grit-blasted surface having a similar $R_a$. Compared to grit blasting, the thermally sprayed surface is more easily and consistently formed as well.

Under magnification, the #2 wire arc surface appears to be a series of mountains and valleys. It is more complex than a sanded or blasted surface. The thermally sprayed powder surfaces produce a more complex surface that looks like a sintered metal under a microscope. The elastomer can actually diffuse into the thermal spray coating to the depth of a few mils.

The roughest surfaces, approximately 1000 microinches Ra or greater, provide the best diffusion of stress concentrations at the bonding interface or boundary 16. The bond interface 16 becomes thicker and more diffused.

If the metal or alloy of the somewhat porous thermal spray layer is dissimilar from the core material, it may be possible to have galvanic corrosion at the interface between the roller core 11 and the permeable layer. The two metals and the water (which will contain some electrolytes) will form a battery (in localized areas) and corrosion will occur at the anode, usually the (steel) core. Even though the core and thermal sprayed layer should be in solid electrical contact (i.e. a short circuit) and should not form a battery, the oxides present in the thermal spray coating can act as an insulator at the core interface depending on the material sprayed, the spray equipment, and the spray parameters.

Figure 3:
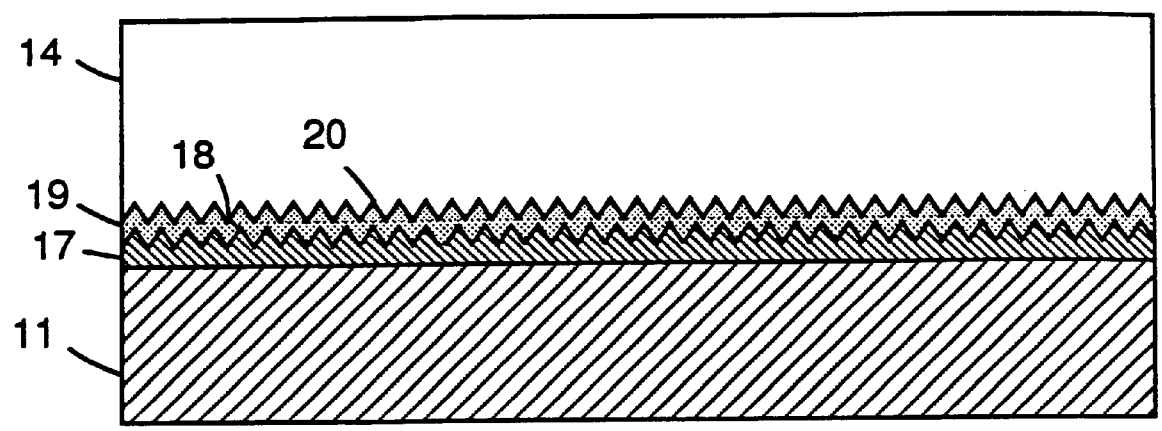
FIG. 3 is a detail sectional view of a second embodiment of the present invention taken in the same plane as FIG. 2.

In order to avoid the possibility of corrosion, the thermal spray layer can be made in two layers of differing porosity levels as illustrated in FIG. 3. The first body of material 17 and the second body of material 19 should comprise the same metal or alloy material in order to avoid galvanic corrosion between the sprayed layers. The first body of material 17 can be applied by plasma spraying or HVOF (high velocity oxy-fuel) spraying or low velocity flame spraying to produce a relatively dense, pore-free coating. It should be understood that the coating 17 can be the result of several passes of the spray gun which provides several thinner coatings that are merged into a thicker coating. The second body of material 19 can be then applied by the wire arc step to provide a coarse, porous coating, using the techniques described above. A suitable thickness for the dense body of material 17 is in the range of 3 to 60 mils, but is more preferably in the range of 10 to 20 mils.

The second body of material 19 can then be applied in a second layer without any additional surface preparation. Excellent bonding between layers would be achieved due to the resulting roughness of surface 18 of the thermally sprayed material 17.

In the case of thermally sprayed powder coatings used as the only layer 19, a layer of Eutectic 18923 (or other nickel based corrosion resistant alloys or stainless steels), 3 mils or more in thickness, generally provides adequate corrosion protection of the core in lieu of the layer 17 of dense metal or alloy material.

The above has been a description of the detailed, preferred embodiments of the apparatus of the present invention. Various modifications to the details which are described above, which will be apparent to those of ordinary skill in the art, are included within the scope of the invention, as will become apparent from the following claims.

We claim:

1. A roller comprising:
   a roller core;
   a bond coat bonded to the core to provide an outer surface roughness;
   a coat of elastomeric material bonded to the bond coat; and
   wherein said bond coat comprises a thermally sprayed material selected from a group of materials consisting of metals, metal alloys, ceramics and cermets having an outer surface roughness in a range from 401 microinches $R_a$ to approximately 2000 microinches $R_a$; and
   wherein the elastomeric material is either silicone rubber or a natural rubber or a synthetic rubber or a urethane elastomer.

2. The roller of claim 1, wherein the bond coat material is either a metal wire, a rod or a powder material.

3. The roller of claim 1, wherein the bond coat comprises a plurality of coating layers.

4. The roller of claim 1, wherein the core is made of metal.

5. The roller of claim 1, wherein the thickness of the bond coat is in a range from 2 mils to 250 mils inclusive.

6. The roller of claim 1, wherein the bond coat further comprises a single layer having a thickness of at least 2 mils.

7. The roller of claim 1, wherein the core is made of a fiber-reinforced material.

8. The roller of claim, 1 wherein the bond coat is a 300 series or 400 series stainless steel alloy.

9. The roller of claim 1, wherein the bond coat is a nickel-chromium alloy.

10. The roller of claim 1, wherein the bond coat is a nickel-based alloy.

11. The roller of claim 1, wherein the elastomer is applied by casting, extrusion, or wrapping with calendared rubber sheets.

12. The roller of claim 1, wherein the rubber covering material comprises a natural or synthetic elastomer.

13. The roller of claim 1, wherein mechanical and chemical bonding agents are disposed in the roller to assist bonding between the thermal spray bond coat and the elastomeric covering material.

14. The roller of claim 1, wherein the thermally sprayed bond layer is disposed over an existing thermally sprayed bond layer that has been cleaned of grease, oil, and contaminant.

15. The roller of claim 1, wherein the core diameter is maintained at a specified value by the adjustment of thickness of the thermally sprayed bond layer.

16. A roller comprising:
   roller core;
   a bond coat bonded to the core to provide an outer surface roughness;

a coat of elastomeric material bonded to the bond coat; and wherein said bond coat comprises a thermally sprayed material selected from a group of materials consisting of metals, metal alloys,, ceramics and cermets;

a layer of elastomeric material disposed over the bond coat; and wherein the bond coat further comprises a first layer and a second layer, the first layer having a greater density and less porosity than the second layer so as to resist corrosion of the core.

17. The roller of claim 16, wherein the bond coat has a surface roughness in a range from 401 microinches $R_a$ to approximately 2000 microinches $R_a$.

18. The roller of claim 16, wherein the second layer is coarser than the first layer for the purpose of assisting mechanical bonding to the elastomeric layer.

19. The roller of claim 16, wherein the elastomeric material is either silicone rubber or a urethane elastomer or EDPM rubber.

* * * * *